United States Patent [19]

Rankin et al.

[11] Patent Number: 5,240,453
[45] Date of Patent: Aug. 31, 1993

[54] ANIMAL STICKING

[75] Inventors: Russel J. Rankin, Clear Mountain; Graeme L. J. Wescombe, Manly West; David J. de Chastel, deceased, late of Virginia, by Ann de Chastel, executrix; John W. Buhot, Coorparoo; Raymond M. White, Capalaba; David T. Kerr, Beenleigh; Phillip R. Boyce, Tingalpa; Robert W. Tritchler, Manly, all of Australia

[73] Assignees: Commonwealth Scientific & Industrial Research Organisation; Australian Meat & Live-Stock Research Development, both of Australia

[21] Appl. No.: 689,826
[22] PCT Filed: Nov. 23, 1989
[86] PCT No.: PCT/AU89/00508
  § 371 Date: May 31, 1991
  § 102(e) Date: May 31, 1991
[87] PCT Pub. No.: WO90/05454
  PCT Pub. Date: May 31, 1990

[30] Foreign Application Priority Data

Nov. 23, 1988 [AU] Australia .................. PJ1602

[51] Int. Cl.$^5$ ............................................. A22B 3/00
[52] U.S. Cl. ..................................... 452/65; 452/63; 452/67
[58] Field of Search ............... 452/65, 67, 63, 149, 452/66

[56] References Cited

U.S. PATENT DOCUMENTS

| | | | |
|---|---|---|---|
| 1,118,635 | 11/1914 | Cassard | 452/65 |
| 2,001,232 | 5/1935 | Wilson | 452/65 |
| 4,215,451 | 8/1980 | Wikoff | 452/133 |
| 4,368,650 | 1/1983 | Wetzel et al. | 452/133 |

FOREIGN PATENT DOCUMENTS 384498 8/1973 U.S.S.R. .................. 452/65

Primary Examiner—Willis Little
Attorney, Agent, or Firm—Lowe, Price, LeBlanc & Becker

[57] ABSTRACT

An animal sticking apparatus for sticking an animal to be slaughtered comprises a sticking tool (10) having two rotary or oscillating cutting blades (16) and support means (21) mounting the sticking tool (10) for insertion and withdrawal movements. The cutting blades (16) perform a cutting operation upon insertion and advancement of the sticking tool (10) into the thoracic entrance of the chest cavity of the animal, the sticking (10) tool cutting tissues as it is advanced and enabling the stick wound to remain open upon withdrawal of the sticking tool to promote rapid exsanguination. The sticking tool (10) after insertion into the animal is pivoted about a remote axis (A) to sever blood vessels near to the animal heart ensuring massive and rapid blood flow. A pair of cutting blades (27) are operative to cut the hide of the animal to form a pre-cut (B) before insertion of the sticking tool (10), the blades (27) being movable apart to separate the hide at the pre-cut (B) so as to expose a substantially sterile surface into which the sticking tool (10) is inserted. The pre-cut blades (27) have cutting edges (29) forming an acute angle to the hide surface and cause a cutting action from the hide inside the surface to the outside for maintaining substantially sterile conditions on the inside of the hide pre-cut (B).

21 Claims, 3 Drawing Sheets

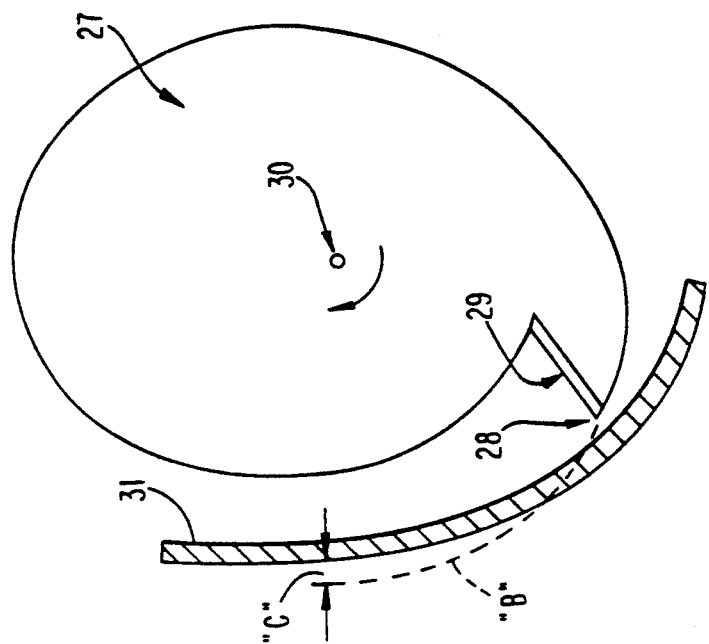
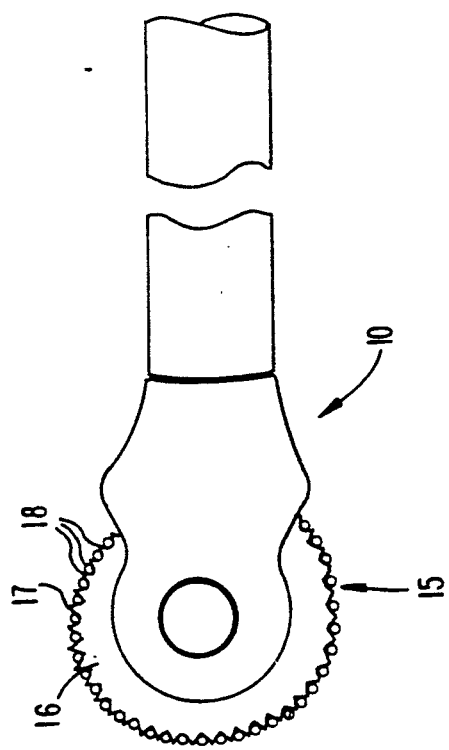
Fig. 4
Fig. 3

ANIMAL STICKING

BACKGROUND OF THE INVENTION

This invention relates to animal sticking carried out during the slaughtering of animals for meat production.

In the past, the operation of sticking an animal has been carried out manually by a slaughterman. The operation involves plunging a knife into the animal after stunning so as to sever blood vessels, causing rapid bleeding and resulting in death by exsanguination. The animal is stunned (electrically or mechanically) and then after removal in an unconscious state from the "knocking box" is hung by the rear legs. The slaughterman plunges a knife into the thoracic inlet of the animal's chest cavity and severs the main arteries adjacent to the heart causing rapid bleeding upon removal of the knife. Manual operations, including sticking, add substantially to the cost of processing animals for meat.

In U.S. Pat. No. 4,716,625 in the name of Nijhuis there is shown a mechanical sticking implement which comprises a hollow knife which is pivoted into an operative position in which it penetrates a pig's neck and severs the carotid arteries. This mechanical sticking arrangement may be ineffective if it does not accurately locate and cut the carotid arteries. Also the bleeding may be relatively slow.

SUMMARY OF THE INVENTION

It is an object of the present invention to provide an apparatus for animal sticking which is effective and susceptible to automation.

According to the present invention there is provided an animal sticking apparatus for sticking an animal to be slaughtered which is positioned in a generally known position, the apparatus comprising a sticking tool and support means mounting the sticking tool for insertion and withdrawal movements, the sticking tool being movable so as to be brought into contact with and to be advanced so as to be inserted into the animal in the known position, the sticking tool having a forward cutting means for performing a cutting operation upon insertion and advancement of the sticking tool into the animal, the sticking tool cutting tissues as it is advanced and enabling the stick wound to remain open upon withdrawal of the sticking tool to promote rapid exsanguination.

Preferably the cutting means may comprise a cutting blade having a cutting edge which is moved transverse to the general line of insertion of the sticking tool to perform the cutting action on the tissues. The cutting means may comprise two cutting blades which are movable relative to each other upon advancing movement of the sticking tool so as to thereby create a shearing action as the cutting means is inserted and advanced into the animal. In this embodiment, the cutting blades preferably comprise two facing cutting blades having adjacent cutting edges, the two blades being relatively rotated or oscillated in opposite directions so as to create a shearing action between the blade edges. The cutting blades may be arcuate in side view with the outer edges of the arcuate blades having serrations defining the cutting edges.

The apparatus preferably further includes drive means for moving the cutting means, the support means including a longitudinal support for the cutting means, the longitudinal support being movable longitudinally to advance and retract the cutting means, the apparatus further including water supply means for supplying water under pressure through the longitudinal support so that the water emerges at the cutting means so as to continuously carry blood away from the cutting means.

Preferably transverse movement means is provided for moving the sticking tool after insertion into the animal in a direction transverse to the general line of insertion of the sticking tool so as to thereby increase the effectiveness of the cutting action and particularly increase the chances of severing blood vessels near to the heart ensuring massive and rapid blood flow. The transverse movement means preferably comprises means for moving the sticking tool in a pivoting movement about an axis remote from the cutting means at the forward end of the sticking tool, the movement comprising an oscillating movement on either or both sides of the general line of insertion. In the embodiment having the cutting means comprising at least one generally planar cutting blade, the line of oscillating movement of the sticking tool effected by the transverse movement means is preferably generally parallel to the plane of the cutting blade.

In animal sticking apparatus for use with animal locating means operable to locate the animal in a generally upright position, the sticking tool is preferably movable so as to enter the thoracic entrance of the chest cavity of the animal, the support means being selectively vertically adjustable so as to adjust the height at which the tool penetrates into the animal. Also, when the animal locating means is operative to locate the animal in a generally upright position, the locating means preferably comprises generally horizontal rails extending longitudinally under the leg pits of the animal so as to support the animal with the legs hanging freely.

The animal sticking apparatus preferably further includes a cutting implement operative to cut the hide of the animal to form a pre-cut before insertion of the sticking tool into the animal, the apparatus further including separating means operative to separate the hide at the pre-cut so as to expose a substantially sterile surface into which the sticking tool is inserted.

In accordance with a second aspect of the invention, there is provided an animal sticking apparatus for sticking an animal to be slaughtered which is positioned in a generally known position, the apparatus comprising a sticking tool and support means mounting the sticking tool for insertion and withdrawal movements, a cutting implement operative to cut the hide of the animal to form a pre-cut before the insertion movement of the sticking tool takes place, separating means operative to separate the hide at the pre-cut so as to expose a substantially sterile surface, the sticking tool being movable so as to be brought into contact with and to be advanced so as to be inserted into the animal in the known position, the sticking tool being inserted into the animal through the exposed sterile surface at the pre-cut in the hide.

The cutting implementpreferably comprises a pre-cut blade which forms an incision along a pre-cut line, the pre-cut blade then being movable laterally to separate the hide along the pre-cut line. The pre-cut blade may have a leading point operative to pass through the hide, the pre-cut blade having a cutting edge extending from the leading point outwardly relative to the hide so that as the pre-cut blade is advanced, the cutting edge forms an acute angle to the hide surface along the line of the part of the pre-cut already formed, thereby causing a cutting action from the hide inside surface to the outside for maintaining substantially sterile conditions on the inside of the hide pre-cut. The pre-cut blade may be arcuate shaped in side view with the cutting edge forming an outward step or shoulder in the arcuate shape, the blade being rotated to form the pre-cut in the hide.

On opposite sides of the pre-cut blade there may be provided knife shields arranged to be pressed against the hide, the pre-cut blade being rotated between the shields to emerge from between the shields and to form the pre-cut to a predetermined depth through the hide.

Preferably there are provided two pre-cut blades closely adjacent to each other, which, after formation of the pre-cut, are maintained in a position in which the blade peripheral edges remain below the hide outer surface and within the pre-cut, the two pre-cut blades then being separated so as to seperate the hide along the pre-cut line.

Possible and preferred features of the present invention will now be described with particular reference to the accompanying drawings. However it is to be understood that the features illustrated in and described with reference to the drawings are not to be construed as limiting on the scope of the invention.

BRIEF DESCRIPTION OF THE DRAWINGS

FIG. 3 is a side view of one possible sticking tool, and

FIG. 4 is a side view of a possible pre-cut blade for use in forming the hide pre-cut.

DETAILED DESCRIPTION OF THE DRAWINGS

Figure 1:
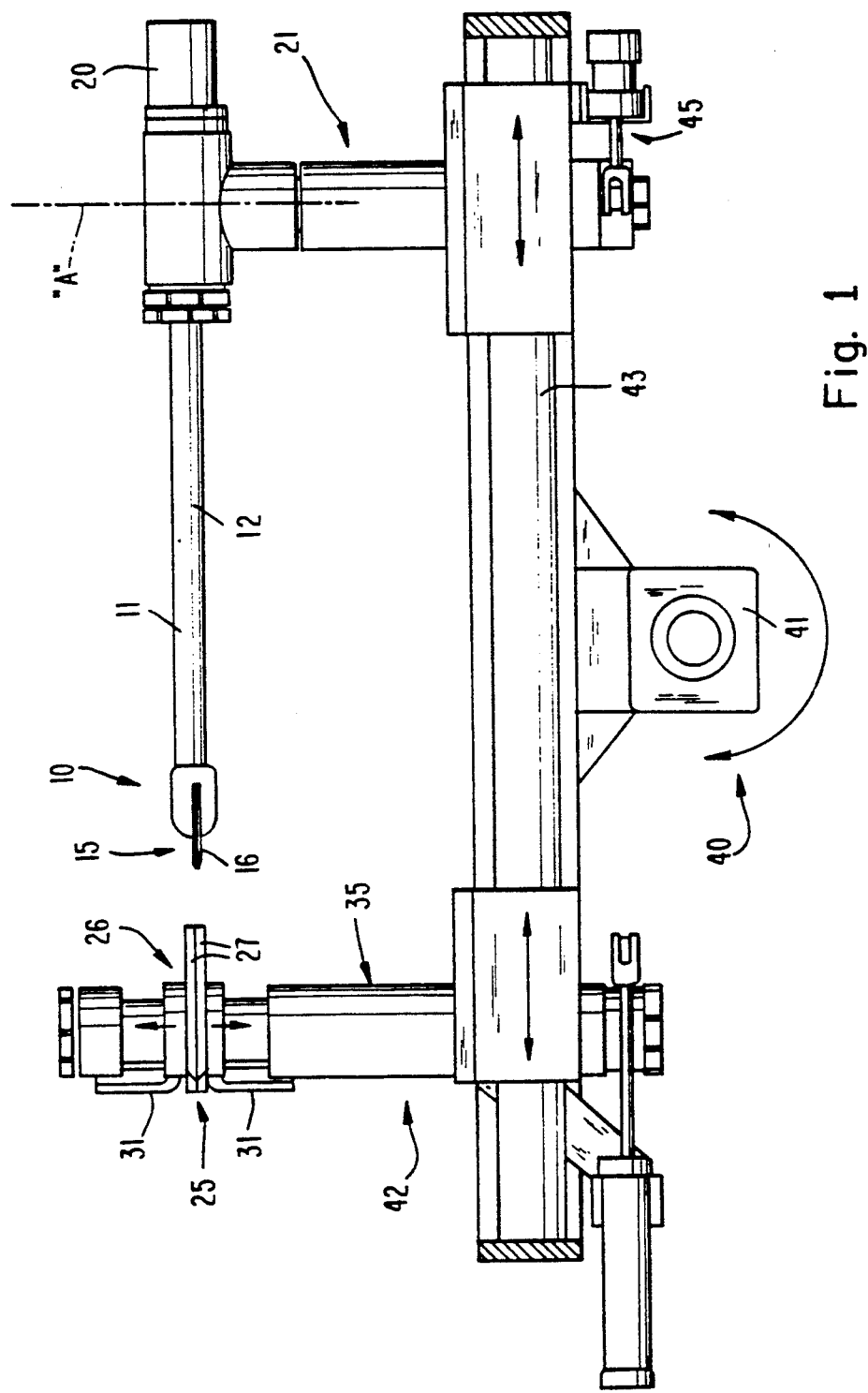
FIG. 1 is a schematic plan view of a sticking apparatus according to one embodiment of the present invention.
Figure 2:
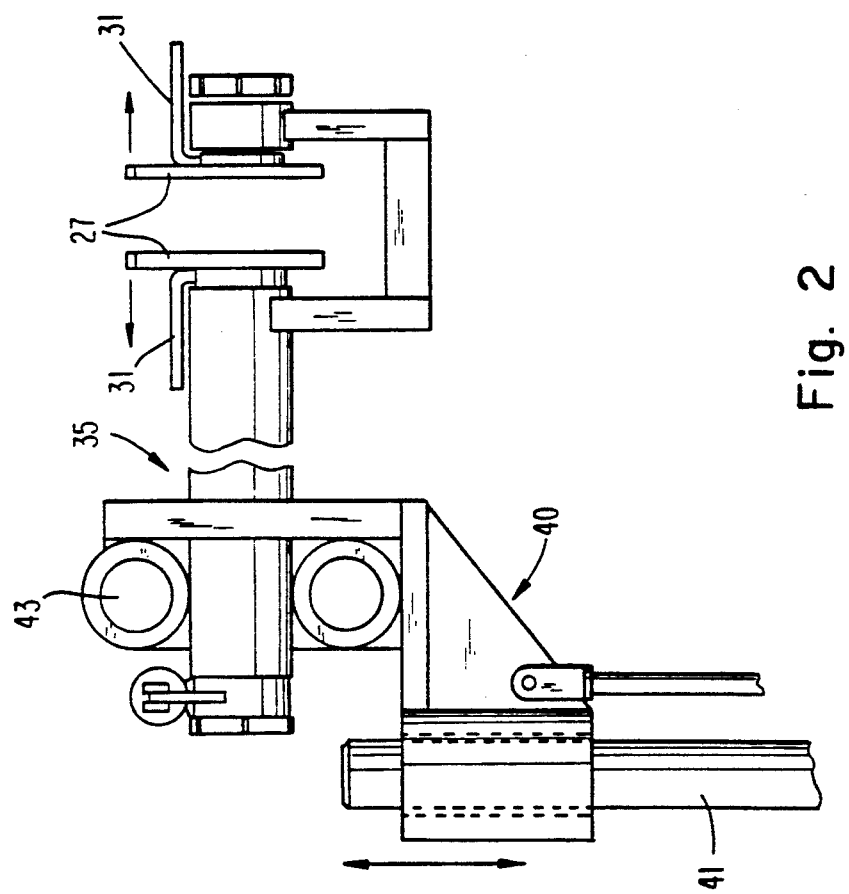
FIG. 2 is a front elevational view of a pre-cut assembly of FIG. 1 showing the pre-cut blades separated.

In animal sticking according to the present invention, an animal to be slaughtered is to be positioned in a generally known position and a sticking tool 10 is extended automatically so that the tool is brought into contact with and is advanced to enter the animal, preferably passing into the thoracic entrance of the animal's chest cavity. The sticking tool 10 is adjustable in position prior to insertion into the animal so as to enable adjustment of the position of insertion. Preferably the animal is located in a generally upright condition and the sticking tool 10, as more fully described later, is selectively vertically adjustable so as to adjust the height at which the tool penetrates into the thoracic entrance of the chest cavity. The animal in practice may be stunned and spinally inactivated, say prior to insertion of the sticking tool 10 into the animal e.g. by passing a suitable electric current between electrodes brought into contact with the animal's head and spine. The inactivation stops all animal reactions helping location of the sticking tool 10 by ensuring the animal is still. For example, the animal may be located in the generally upright condition, e.g. in a sternal recumbency position with the sterum being generally horizontal. The animal, for example, may be supported, e.g. in the knocking box of a slaughter facility, with the legs of the animal hanging free by generally horizontal rails extending longitudinally under the "leg pits" of the animal. Further details of this suitable apparatus for locating and stunning an animal, particularly cattle for slaughter, are shown in Patent Specification Nos. AU 35,992/84 and 19,034/88.

The animal can be stunned and the spinal column inactivated by suitable application of electric current.

The preferred vertical adjustment facility for the insertion of the sticking tool is desirable to enable the apparatus to be used with different sizes of animals. The principal size variant is the animal height and therefore the height of the animal may if desired be automatically sensed and the height of the sticking tool 10 may be adjusted in response to sensing of the animal height. For example, the height of the animal may be sensed automatically in the knocking box e.g. by sensing the height of the animal at the shoulders. However the height sensing when the animal is supported in the sternal recumbency position need not be critical in the case of cattle since supporting the animal beneath the leg pits eliminates most of the height variation of the thoracic entrance of the chest cavity if the support rails are at the same height regardless of animal size. In addition to adjustable vertical provision, the lateral position and length of stroke of the sticking tool may also be selectively adjustable, preferably automatically using suitable sensors.

In the drawings, the sticking tool 10 comprises a generally elongated sticking tool 11 having a forward cutting means 15 for performing a cutting operation upon advancement of the sticking tool 10 into the thoracic entrance. The sticking tool 11 is in use advanced generally along its longitudinal axis. The cutting means 15 at the forward end of the sticking tool 11 is operative to cut tissue as the sticking tool 11 is advanced and penetrates the animal, the cutting action being carried out across a substantial width of tissue.

The cutting means 15 in the illustrated embodiment comprises a pair of cutting blades 16 which are relatively movable so as to create a shearing action as the cutting blades 16 are relatively moved and advanced. In FIG. 3, the cutting blades 16 comprise two facing cutting blades having adjacent cutting edges 17, the two blades 16 being rotated or oscillated in opposite directions so as to create a shearing action between the blade edges 17. The cutting blades 16 may be arcuate or, as shown, circular in side view with the outer edges 17 of the blades having serrations 18 defining the cutting edges.

The cutting blades 16 may be provided with cutting serrations 18 such as generally saw tooth shaped teeth around the periphery thereof, the two blades 16 being either rotated or oscillated in opposite directions to create the shearing action between the opposed teeth. With this arrangement as the blades 16 move against each other and the sticking tool 11 is advanced, the tissues are cut. This is preferable to forcing the animal tissues to part which might otherwise allow the incision to partially close as the sticking tool 11 is withdrawn thus dramatically reducing the blood flow and hence the effectiveness of the stick.

The blades 16 of the preferred embodiment of the sticking tool may be driven for example by an air motor or other power unit 20. The sticking tool 11 and power unit 20 are carried by a sticking support 21 which is movable longitudinally to advance and retract the sticking tool 11. The possibility of ingress of blood between the blades 16 and into the drive mechanism may be reduced by having water under pressure supplied through the longitudinal support arm 12 of the sticking tool 11, the water emerging at the blades 16 so as to continuously carry blood away from the blades 16 and prevent blood passing between the blades 16 into the drive mechanism.

The severing of the animal tissues by means of the cutting blades 16 allows the sticking tool 11 to penetrate into the chest cavity with relative ease and also enables the stick wound to remain open to ensure a rapid and massive blood flow upon withdrawal.

The sticking tool 11 is movable transverse to the general line of insertion of the sticking tool after insertion into the animal so as to thereby increase the chances of successfully severing blood vessels near to the heart ensuring massive and rapid blood flow. The movement of the sticking tool 11 may be a pivoting movement about an axis "A" remote from the cutting means 15 at the forward end of the sticking tool 11, the movement comprising an oscillating movement of several degrees on either side of the general line of insertion. The line of oscillating movement is parallel to the general plane of the cutting blades 16.

The preferred apparatus is operative to cut the animal hide at the location of sticking tool insertion to form a "pre-cut" and to separate the hide at the pre-cut, and while the hide is separated, the sticking tool 11 is then advanced and inserted. Since normally any penetration of a blade or tool through the hide of a carcass will carry some contamination from the outside of the hide into the meat, a carcass normally requires additional trimming around a stick wound. However, by cutting the hide and separating the hide prior to insertion of the sticking tool 11, the sticking tool can penetrate into a sterile surface obviating the need for later trimming with loss of saleable meat and with additional processing costs.

In the preferred embodiment of the apparatus there is provided a cutting implement 25 operative to cut the animal hide along a length to form a "pre-cut", and separating means 26 operative to separate the hide at the pre-cut so as to expose a substantially sterile surface into which the sticking tool 11 is inserted. The cutting implement 25 preferably comprises a pre-cut blade or blades 27 which form an incision along a pre-cut line, the blade(s) 27 then being moved laterally to separate the hide along the pre-cut line. In the preferred case of two pre-cut blades 27, the two pre-cut blades may be moved apart to separate the hide.

The pre-cut blades 27 may be operative to cut the hide from the hide inside surface in an outwards direction. For this purpose each pre-cut blade 27 in FIG. 4 has a leading point 28 operative to pass through the hide, and a cutting edge 29 extending outwardly from the leading point 28 so that as the pre-cut blade 27 is advanced, the cutting edge 29 forms an acute angle to the hide surface along the line of the part of the epre-cut already formed. This will cause a cutting action from the hide inside surface to the outside for maintaining substantially sterile conditions on the inside of the hide pre-cut.

The or each pre-cut blade 27 is arcuate shaped in side view with the cutting edge 29 forming an outward step or shoulder in the arcuate shape. The blade 29 is rotated about axis 30 to form the pre-cut in the hide. On opposite sides of the blades 27 there are provided knife shields 31 in the form of plates arranged to be pressed against the hide, the pre-cut blades 27 being rotated between the shields 31 to emerge from between the shields and to form the pre-cut "B" to a predetermined depth "C" through the hide. The knife shields 31 help to determine the depth "C" of the pre-cut "B" and also maintain the hide steady against movement during the cutting operation.

After formation of the pre-cut "B" the blades 27 are separated. The separation of the pre-cut blades 27 can be arranged to separate the hide by maintaining the pre-cut blades 27 in a position in which the blade peripheral edges remain below the hide outer surface and within the pre-cut "B" at the end of the cutting stroke. In this way, as the pre-cut blades 27 are separated, the peripheral edges will part the hide at the pre-cut "B". The separation of the blades 27 may be carried out by mounting the pre-cut blades 27 on a support arm 35 which extends transverse to the animal with the pre-cut blades 27 being selectively movable apart along the arm. The knife shields 31 are also movable apart with the pre-cut blades 27, the shields 31 remaining in contact with the hide on either side of the pre-cut.

The apparatus including the sticking tool and the transverse arm 35 carrying the pre-cut blades 27 and knife shields 31 may be mounted on the main support 40 which in turn is mounted by a main support post 41 which is arranged vertically in front of and to one side of the animal. The main support 40 is rotatable about the vertical axis of the support post 41 so that the cutting implement 25 and separating means 26 are swung into position and in contact with the animal hide at the location of insertion of the sticking tool 11. If desired the pre-cut assembly 42 comprising the cutting implement 25 and the separating means 26 may be selectively movable longitudinally along a horizontal support 43 comprising part of the main support 40 so that, after the main support 40 is swung into a position in front of the animal, the cutting implement 25 and separating means 26 can be moved longitudinally into contact with the animal hide. Movement of the main support 40 and the pre-cut assembly 42 may be by means of hydraulic rams or the like. Similarly, separation of the pre-cut blades 27 after formation of the pre-cut "B" in the hide may be carried out by a hydraulic ram.

The sticking tool 11 is supported by the sticking support 21 which is also carried by the main support 40 and particularly by the horizontal support 43. The sticking support 21 is movable by hydraulic ram 45 so as to advance and retract the sticking tool 11.

After the sticking operation the main support 40 is pivoted away from the animal about the vertical axis of the support post 41 enabling the stuck animal to be moved away from the sticking station for bleeding and further processing. The sticking apparatus including the sticking tool 11 and the cutting implement 25 of the pre-cut assembly 42 are sterilised before re-use.

It will be seen that the sticking method and apparatus as herein described and illustrated can be used to automatically stick an animal, the stick causing rapid exsanguination particularly due to the cutting of tissues upon insertion of the sticking tool. The sticking operation can be carried out such that there is no contamination of the stick wound caused by carrying contamination from the animal hide so that there is no need for later trimming away tissue around the stick wound during further carcass processing.

It is to be understood that various alterations, modifications and/or additions may be made to the features of the possible and preferred embodiment(s) of the invention as herein described without departing from the spirit and scope of the invention as defined in the appended claims.

We claim:

1. An animal sticking apparatus for sticking an animal to be slaughtered which is positioned in a generally known position, the apparatus including; a sticking tool (10) and support means (21) mounting the sticking tool (10) for insertion and withdrawal movements, the sticking tool (10) being movable so as to be brought into contact with and to be advanced so as to be inserted into the animal in the known position, the sticking tool (10) having a forward cutting means (15) for performing a cutting operation upon insertion and advancement of the sticking tool (10) into the animal, the cutting means comprising two cutting blades each having a cutting edge which is moved transverse to the general line of insertion of the sticking tool to perform the cutting action on the tissues, the two cutting blades being movable relative to each other upon advancing movement of the sticking tool so as to thereby create a shearing action as the cutting means is inserted and advanced into the animal and enabling the stick wound to remain open upon withdrawal of the sticking tool to promote rapid exsanguination.

2. An animal sticking apparatus as claimed in claim 1 characterised in that the cutting blades (16) comprise two facing cutting blades (16) having adjacent cutting edges (17), the two blades being relatively rotated or oscillated in opposite directions so as to create a shearing action between the blade edges (17).

3. An animal sticking apparatus as claimed in claim 2 characterised in that the cutting blades (16) are arcuate in side view with the outer edges (17) of the arcuate blades (16) having serrations (18) defining the cutting edges (17).

4. An animal sticking apparatus as claimed in claim 1 and further characterised by drive means (20) for moving the cutting means (15), the support means (21) including a longitudinal support (12) for the cutting means (15), the longitudinal support (12) being movable longitudinally to advance and retract the cutting means (15), the apparatus further including water supply means for supplying water under pressure through the longitudinal support (12) so that the water emerges at the cutting means (15) so as to continuously carry blood away from the cutting means (15).

5. An animal sticking apparatus as claimed in claim 1 and further characterised by transverse movement means for moving the sticking tool (10) after insertion into the animal in a direction transverse to the general line of insertion of the sticking tool (10) so as to thereby increase the effectiveness of the cutting action and particularly increase the chances of severing blood vessels near to the heart ensuring massive and rapid blood flow.

6. An animal sticking apparatus as claimed in claim 5 characterised in that the transverse movement means comprises means for moving the sticking tool (10) in a pivoting movement about an axis (A) remote from the cutting means (15) at the forward end of the sticking tool (10), the movement comprising an oscillating movement on either or both sides of the general line of insertion.

7. An animal sticking apparatus as claimed in claim 5 or 6 characterised in that the cutting means (16) comprises at least one generally planar cutting blade (16), the line of oscillating movement of the sticking tool (10) effected by the transverse movement means being generally parallel to the plane of the cutting blade (16).

8. An animal sticking apparatus as claimed in claim 1 and for use with animal locating means operable to locate the animal in a generally upright position, characterised in that the sticking tool (10) is movable so as to enter the thoracic entrance of the chest cavity of the animal, the support means (21) being selectively vertically adjustable so as to adjust the height at which the tool (10) penetrates into the animal.

9. An animal sticking apparatus as claimed in claim 1 characterised in that the animal locating means is operative to locate the animal in a generally upright position, the locating means comprising generally horizontal rails extending longitudinally under the leg pits of the animal so as to support the animal with the legs hanging freely.

10. An animal sticking apparatus as claimed in claim 1 and further characterised by a cutting implement (25) operative to cut the hide of the animal to form a pre-cut (B) before insertion of the sticking tool (10) into the animal, the apparatus further including separating means (26) operative to separate the hide at the pre-cut (B) so as to expose a substantially sterile surface into which the sticking tool (10) is inserted.

11. An animal sticking apparatus as claimed in claim 10 characterised in that the cutting implement (25) comprises a pre-cut blade (27) which forms an incision along a pre-cut line, the pre-cut blade (27) then being movable laterally to separate the hide along the pre-cut line.

12. An animal sticking apparatus as claimed in claim 11 characterised in that the pre-cut blade (27) has a leading point (28) operative to pass through the hide, the pre-cut blade (27) having a cutting edge (29) extending from the leading point (28) outwardly relative to the hide so that as the pre-cut blade is advanced, the cutting edge (29) forms an acute angle to the hide surface along the line of the part of the pre-cut (B) already formed, thereby causing a cutting action from the hide inside surface to the outside for maintaining substantially sterile conditions on the inside of the hide pre-cut (B).

13. An animal sticking apparatus as claimed in claim 12 characterised in that the pre-cut blade (27) is arcuate shaped in side view with the cutting edge (29) forming an outward step or shoulder in the arcuate shape, the blade (29) being rotated to form the pre-cut (B) in the hide.

14. An animal sticking apparatus as claimed in claim 13 characterised in that on opposite sides of the pre-cut blade (27) there are provided knife shields (31) arranged to be pressed against the hide, the pre-cut blade (27) being rotated between the shields (31) to emerge from between the shields (31) and to form the pre-cut (B) to a predetermined depth (C) through the hide.

15. An animal sticking apparatus as claimed in claim 11 characterised in that there are provided two pre-cut blades (27) closely adjacent to each other, which, after formation of the pre-cut (B), are maintained in a position in which the blade peripheral edges remain below the hide outer surface and within the pre-cut (B), the two pre-cut blades (27) then being separated so as to separate the hide along the pre-cut line.

16. An animal sticking apparatus for sticking an animal to be slaughtered which is positioned in a generally known position, the apparatus being characterised by a sticking tool (10) and support means (21) mounting the sticking tool (10) for insertion and withdrawal movements, a cutting implement (25) operative to cut the hide of the animal to form a pre-cut (B) before the insertion movement of the sticking tool (10) takes place, separating means (26) operative to separate the hide at the pre-cut (B) so as to expose a substantially sterile surface, the sticking tool (10) being movable so as to be brought into contact with and to be advanced so as to be inserted into the animal in the known position, the sticking tool (10) being inserted into the animal through the exposed sterile surface at the pre-cut (B) in the hide.

17. An animal sticking apparatus as claimed in claim 16 characterised in that the cutting implement (25) comprises a pre-cut blade (27) which forms an incision along a pre-cut line, the pre-cut blade (27) then being movable laterally to separate the hide along the pre-cut line.

18. An animal sticking apparatus as claimed in claim 17 characterised in that the pre-cut blade (27) has a leading point (28) operative to pass through the hide, the pre-cut blade (27) having a cutting edge (29) extending from the leading point (28) outwardly relative to the hide so that as the pre-cut blade is advanced, the cutting edge (29) forms an acute angle to the hide surface along the line of the part of the pre-cut (B) already formed, thereby causing a cutting action from the hide inside surface to the outside for maintaining substantially sterile conditions on the inside of the hide pre-cut (B).

19. An animal sticking apparatus as claimed in claim 18 characterised in that the pre-cut blade (27) is arcuate shaped in side view with the cutting edge (29) forming an outward step or shoulder in the arcuate shape, the blade (29) being rotated to form the pre-cut (B) in the hide.

20. An animal sticking apparatus as claimed in claim 19 characterised in that on opposite sides of the pre-cut blade (27) there are provided knife shields (31) arranged to be pressed against the hide, the pre-cut blade (27) being rotated between the shields (31) to emerge from between the shields (31) and to form the pre-cut (B) to a predetermined depth (C) through the hide.

21. An animal sticking apparatus as claimed in claim 17 characterised in that there are provided two pre-cut blades (27) closely adjacent to each other, which, after formation of the pre-cut (B), are maintained in a position in which the blade peripheral edges remain below the hide outer surface and within the precut (B), the two pre-cut blades (27) then being separated so as to separate the hide along the pre-cut line.

* * * * *

UNITED STATES PATENT AND TRADEMARK OFFICE
CERTIFICATE OF CORRECTION

PATENT NO. : 5,240,453
DATED : August 31, 1993
INVENTOR(S) : Russel J. RANKIN et al.

It is certified that error appears in the above-identified patent and that said Letters Patent is hereby corrected as shown below:

On the title page, section [73], change the second Assignee from "Australian Meat & Live-Stock Research Development" to --Australian Meat & Live-Stock Research & Development Corporation--.

Signed and Sealed this

Twenty-sixth Day of April, 1994

Attest:

BRUCE LEHMAN

*Attesting Officer*   *Commissioner of Patents and Trademarks*